United States Patent Office 3,314,675
Patented Apr. 18, 1967

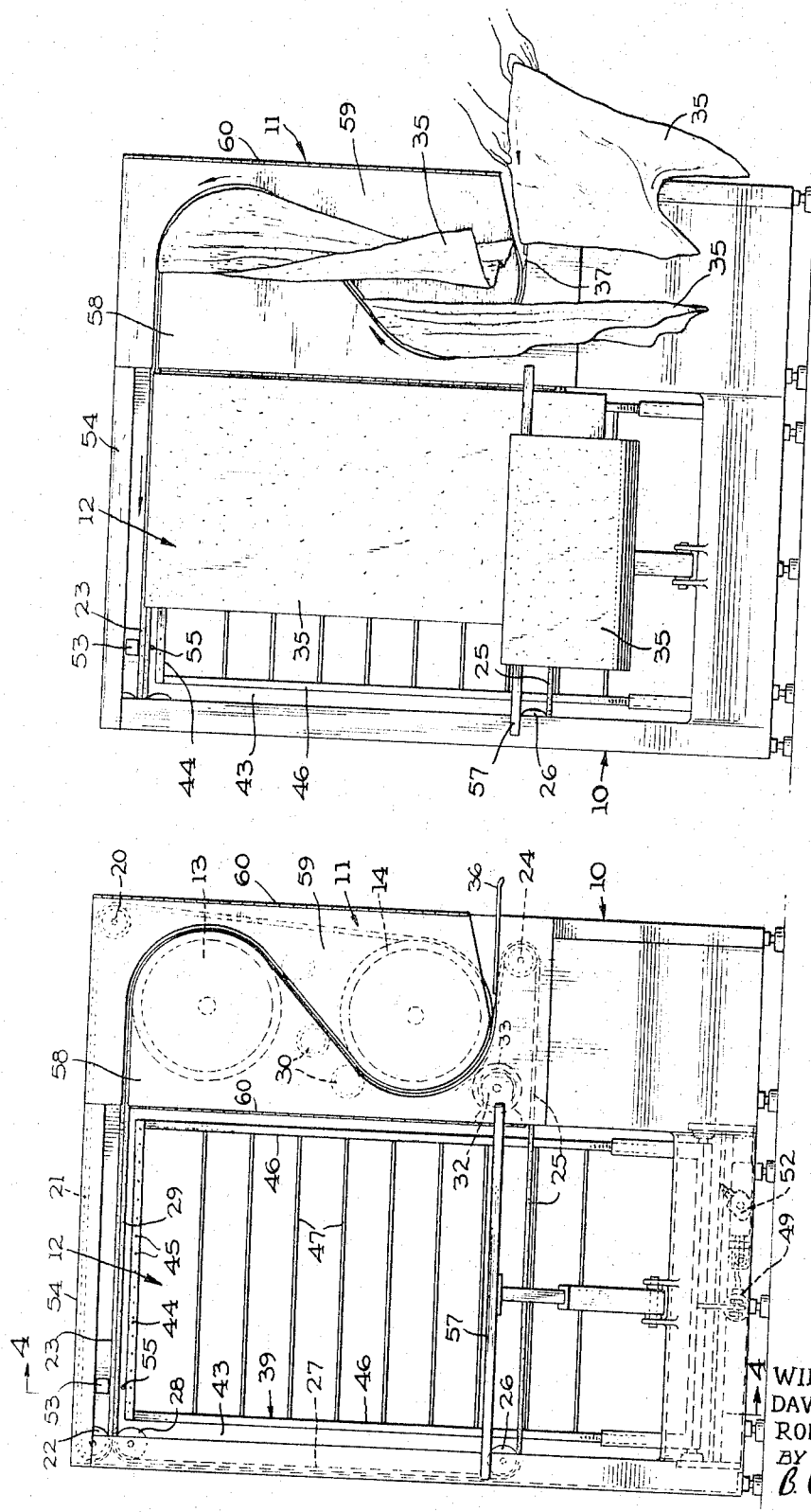

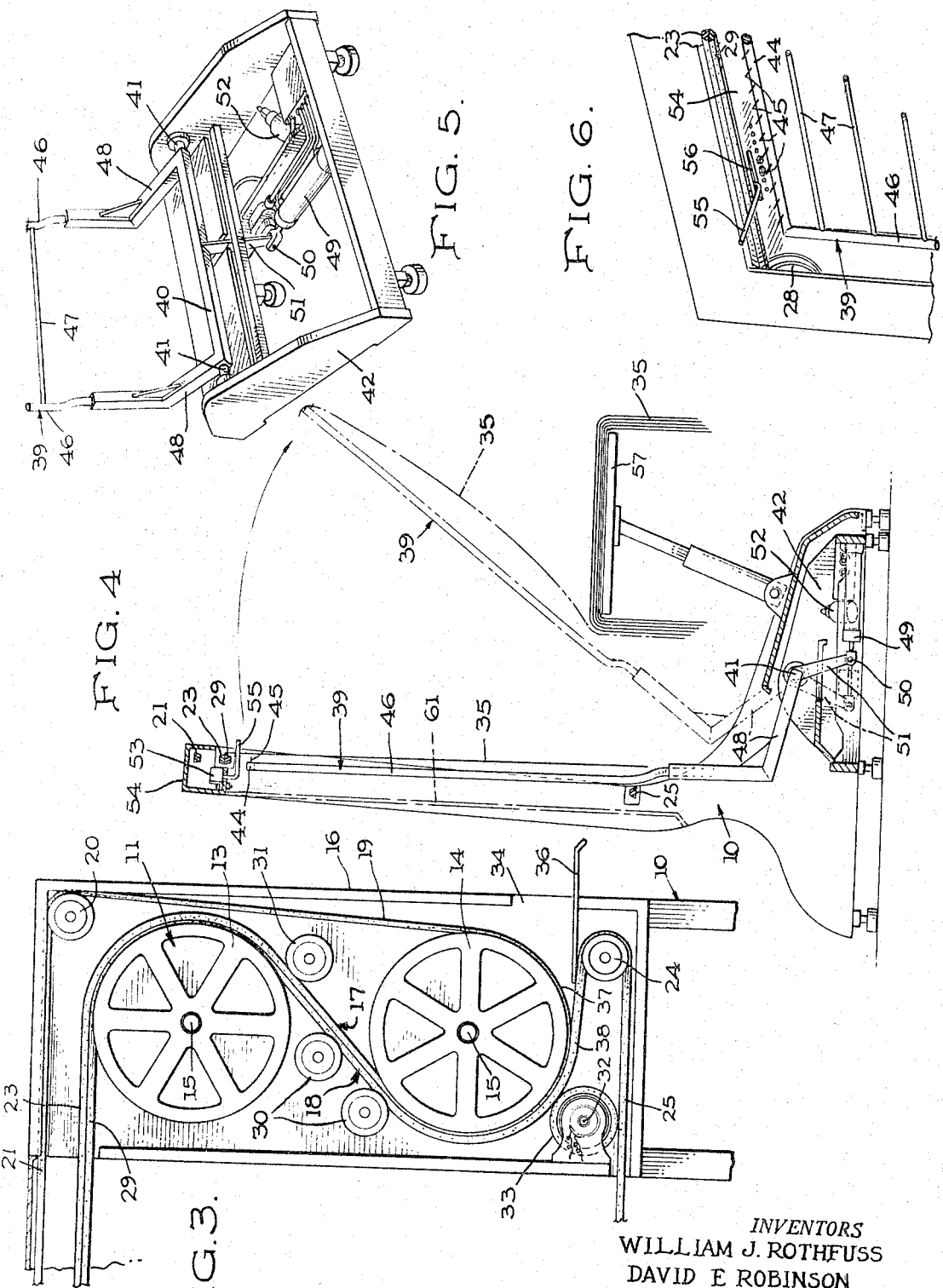

3,314,675
APPARATUS FOR CONVEYING, STRAIGHTENING AND STACKING FLEXIBLE SHEET MATERIAL ARTICLES
William J. Rothfuss, David E. Robinson, and Ronald W. Emus, Greenville, S.C., assignors to Southern Machinery Company, Greer, S.C., a corporation of South Carolina
Filed Mar. 31, 1966, Ser. No. 539,157
7 Claims. (Cl. 271—1)

This application is a continuation-in-part of application Ser. No. 403,255, filed Oct. 12, 1964, for Cloth Article Hemming and Stacking Method and Apparatus, William J. Rothfuss et al.

The present invention relates to apparatus for conveying and stacking flexible sheet material articles, such as towels and various articles of apparel, and the like.

An object of the invention is to provide an apparatus of the mentioned type which is simplified and economical to manufacture and which will stack the cloth articles after conveying them rapidly and in an accurate manner.

Another important object is to provide an apparatus for conveying and stacking articles of the type mentioned and which apparatus requires only a minimum of floor space even though it is capable of handling quite large articles.

Another object is to provide in an apparatus of the mentioned character novel means for maintaining the cloth articles in a substantially smooth or spread-out condition when they reach the stacking station, together with sensing means to control and initiate the operation of the stacking mechanism.

Other objects and advantages of the invention will become apparent during the course of the following detailed description.

In the accompanying drawings forming a part of this application and in which like numerals are employed to designate like parts throughout the same, FIGURE 1 is a front elevation of an apparatus for conveying and stacking, according to the invention;

FIGURE 2 is a similar view of the apparatus illustrating the use of the same in connection with cloth articles;

FIGURE 3 is an enlarged fragmentary side elevation of the conveyer section of the apparatus;

FIGURE 4 is a transverse vertical section taken on line 4—4 of FIGURE 1;

FIGURE 5 is a fragmentary perspective view of a stacking frame and actuating means forming a unit of the apparatus; and FIGURE 6 is a fragmentary perspective view showing an adjustable sensing switch actuator.

In the drawings, wherein for the purpose of illustration is shown a preferred embodiment of the invention, the numeral 10 designates generally a housing and support structure for the apparatus which includes broadly an article conveying section or station 11 and a stacking section or station 12.

At the conveying station 11, the apparatus comprises a pair of large diameter pulleys 13 and 14, arranged one above the other in spaced relation and in the same vertical plane. These two pulleys are supported for rotation on horizontal shafts 15 and the two pulleys and their shafts are in turn supported within a slender vertical box or housing 16 which forms an integral part of the main support structure 10.

A pair of coacting endless gripping and conveyer belts 17 and 18 engage the pulleys 13 and 14 in the manner shown so as to provide substantially a reverse S-shaped path of travel for the cloth articles being introduced into the apparatus and conveyed upwardly and forwardly to the stacking station 12. The belt 17 extends around the lower side of lower pulley 14 and then upwardly substantially vertically at 19 and over a guide pulley 20 at the upper corner of housing 16. From this point, the belt 17 extends horizontally at 21 across the entire width of the apparatus and across the top of the stacking station 12 and engages around another guide pulley 22 at the remote upper corner of the apparatus. From this point, the same belt 17 has a reverse horizontal run 23 back to the large upper pulley 13 and around the outer side of this pulley leading back to the straight diagonal belt portion in between the two pulleys 13 and 14.

The second belt 18, FIGURE 3, lies in contact with the belt 17 between the large pulleys 13 and 14 and extends around one side of the pulley 14 outwardly of the belt 17 and then around a guide pulley 24 near the bottom of the pulley 14. From the guide pulley 24, the second belt extends in a horizontal run 25 across the lower portion of the stacking station 12 and around another guide pulley 26 and then upwardly in a vertical run 27, FIGURE 1, to another guide pulley 28 near the top of the stacking station and from this guide pulley in a horizontal run 29, directly beneath and clampingly engaging the horizontal belt run 23. The second belt 18 then extends around the pulley 13 to complete its circuit, as shown in FIGURE 3.

The two conveyer belts 17 and 18 are formed of rubber-like material which may be reinforced similarly to the usual V-belts employed for power transmission. They are somewhat elastic and quite strong with a minimum of stretch. The belts 17 and 18 are maintained quite tight in the conveyer system of the invention. Additional guide or idler pulleys 30 and 31 may be employed between the pulleys 13 and 14 to assure that the two superposed belts have firm article-gripping contact. These additional guide pulleys may be omitted in some cases.

The endless belts 17 and 18 may be powered in a variety of ways, one illustration of which is shown in the drawings diagrammatically. A suitable motor 32 with speed reducer gearing operates a friction drive wheel 33 which directly engages the periphery of the belt 18 as it passes around the lower pulley 14 to continuously drive the belts in the direction of the arrows shown in FIGURE 2. Other types of drive may be employed and one of the pulleys 13 or 14 may be directly powered, if preferred.

The housing 16 for the pulleys 13 and 14 has a side opening 34 through which the cloth articles 35, such as towels or articles of apparel, may be introduced manually or otherwise, as shown in FIGURE 2. A horizontal table extension 36 is preferably mounted upon the housing at this point to aid the operator in sliding the cloth articles into the nip 37 between the belt portion 38, FIGURE 3, and the lower pulley 14. The table extension 36 is located at a convenient elevation above the floor.

The stacking section 12 of the apparatus includes a vertically swingable stacking frame 39 or transfer member whose lower end is pivotally secured at 41 to a base frame or support 42. The stacking frame and base frame, together with other components to be described, constitute a separate unit from the remainder of the apparatus and separate from the main support 10. This enables the stacking or transfer frame and its actuating means to be slid in and out of the rectangular space 43 in the main support which receives it. Additionally, this unit construction makes the apparatus more readily adaptable to cloth articles of various widths.

The stacking frame 39 is rectangular as shown in FIGURES 1 and 2 and comprises an upper horizontal bar 44 which lies immediately beneath the horizontal belt runs 23 and 29. The bar 44 preferably carries on its forward face a number of pins 45 to engage the cloth articles and remove them from the belt portions 23 and 29 which are gripping and conveying them. Instead of these pins 45, the upper bar 44 may have its forward face covered with coarse emery paper or like friction material. The frame 39 further comprises vertical side bars 46 and a plurality of vertically spaced rods 47 interconnecting the side bars, as shown. As shown in FIGURE 4, the frame 39, while in the inactive position, is substantially upright and disposed within the confines of the surrounding main support 10 having the opening 43. The lower end of the frame 39 includes forwardly extending legs 48 whose leading ends are connected to the cross member 40, as best shown in FIGURE 5. This arrangement places the pivot 41 considerably forwardly of the vertical plane which includes the belt runs 23 and 29 and 21. Consequently, when the frame 39 swings forwardly as shown in broken lines in FIGURE 4, both the upper and lower ends of the cloth article 35 removed from the conveyer belts are caused to travel in a considerable arc around the pivot axis 41. This particular movement of the suspended cloth article contributes to the neat and even stacking of the same and is superior to the arrangement where the frame is pivoted directly at its lower end so that the lower end of the cloth article has very little motion while moving from the suspended to the stacked position.

In order to swing the frame 39 from the upright to the inclined stacking positon shown in FIGURE 4, an air cylinder and piston unit 49 is suitably mounted within the base 42 and the piston rod of this unit is connected at 50 with a depending crank extension 51 of the frame 39. The crank extension is rigid with the cross member 40. The cylinder-piston unit 49 is under control of a conventional valve 52 having a solenoid or the like controlled by a sensing electrical switch 53, mounted upon the top frame member 54 of main support 10. The sensing switch 53 may be a microswitch and has an actuator rod 55 which extends in the path of movement of one vertical edge of each cloth article 35 as the latter is conveyed horizontally by the coacting horizontal belt runs 23 and 29. The switch 53 is bodily adjustable on the frame member 54 so that it can be set for various widths of cloth article. An elongated slot 56 in the frame member 54 permits the sensing rod 55 to be moved when the switch 53 is adjusted. When the approaching vertical edge of the article 35 engages the switch actuator 55, the latter closes a circuit causing operation of the control valve 52, which in turn causes operation of the cylinder-piston unit 49. The circuitry is conventional and well-known in the art and need not therefore be detailed herein. Various types of control valves and fluid pressure operated mechanisms are available on the market for this purpose.

When the unit 49 has its piston rod extended, FIGURE 4, the crank 51 will swing the frame 39 toward the broken line position so that the cloth article 35 will be removed from the overhead belt runs 23 and 29 and deposited neatly on a stacking table 57, as shown. The stacking table 57 may have its height adjusted and the table preferably forms a part of the main supporting structure 10 and is separate from the base 42 as shown in FIGURE 5. When the particular cloth article has been deposited or stacked on the table 57, the frame 39 returns automatically to the upright position shown in FIGURE 4, and this return movement is part of an automatic cycle of operation through the control valve 52. When the frame 39 is returned to the upright position, the apparatus is then in condition for the next oncoming article 35 to engage the switch actuator 55 and cause a repetition of the article stacking cycle. It will be observed particularly in FIGURES 2 and 4 that the article 35 suspended freely from the belts is hanging vertically close to and in front of the frame 39 prior to the stacking cycle.

The front of the box or housing 16 is preferably covered by a pair of hinged doors 58 and 59 whose edges are contoured to follow the generally sinusoidal path of the belts 17 and 18 within the housing 16. This arrangement allows the pulleys 13 and 14 and the belts to be enclosed, as shown in FIGURE 1, and allows the articles 35 to follow the path of the belts by extending through the space afforded by the meeting edges of the doors 58 and 59. The hinges for these doors are indicated at 60 in the drawings.

As an optional feature, the opening 43 may be closed at the rear of the main support by a thin wall or partition shown at 61 in FIGURE 4. If employed, this wall will not interfere with the movement of the frame 39 since the latter does not move rearwardly from its vertical opsition. The purpose of the wall 61 is to reduce drafts through the frame 39 which sometimes adversely affects the handling of more flimsy cloth articles. Heavier cloth articles are not so affected by drafts and air currents.

The general mode of operation of the invention is as follows:

While the belts 17 and 18 are being continuously driven in the direction of the arrows in FIGURE 2, an operator feeds the articles 35 in succession over the table extension 36 and into the nip 37 between the two belts. The articles are then conveyed upwardly by the belts and horizontally toward the stacking station 12, as clearly shown in FIGURE 2. When each article 35 has its leading edge engaged with the switch actuator rod 55, the stacker or transfer frame 39 will be quickly swung to the inclined stacking position of FIGURE 4 and the particular article 35 will be removed from between the belt runs 23 and 29. The pins 45 aid in this removal. The article is neatly deposited by gravity on the stacking table 57, and the frame 39 has returned to its upright position in time to receive the next approaching article on the conveyor.

The operation is continuous and quite rapid and the apparatus conveys, straightens and stacks the cloth articles very efficiently. Adjustments can be made to accommodate articles of various widths, as previously mentioned.

Other types of article sensing means and means for actuating the frame 39 may be employed within the scope of the invention and the presently-disclosed means are merely illustrative.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An apparatus for conveying and stacking cloth articles and the like comprising a continuously moving conveyor means adapted to grip the cloth articles in sucession and carry them in succession to a stacking station, said conveyor means including a pair of opposed contacting endless conveyor belts having a generally sinusoidal article elevating portion and a substantially horizontal conveying portion, said horizontal portion extending across said stacking station, a sensing device at the stacking station in the path of movement of each cloth article and engaged by each article, power means set into operation by the sensing device upon contact of the latter with each article, and a pivoted transfer frame at the stacking station connected with and operated by the power means and engaging one side of each article and pulling each article from the conveyor means and carrying each article away from the conveyor means and depositing it by gravity on a stack support.

2. An apparatus for conveying and stacking cloth articles and the like comprising a continuously moving conveyor means adapted to grip cloth articles in succession and carry them in succession to a stacking station, a sensing device at the stacking station in the path of movement of each cloth article and engaged by each article, power means set into operation by the sensing device upon contact of the latter with each article, and a pivoted transfer frame at the stacking station connected with and operated by the power means and engaging one side of each article and pulling each article from the conveyor means and carrying each article away from the conveyor means and depositing it by gravity on a stack support, said pivoted transfer frame being a generally vertical frame pivoted about its lower end and having a horizontal top bar arranged close to the moving conveyor means for contact with said articles near the tops of the articles to remove them from the conveyor means.

3. The invention as defined by claim 2, and friction means on said top bar to prevent slippage thereof relative to said articles during contact therewith.

4. An apparatus for conveying, straightening and stacking flexible sheet material articles comprising a pair of opposed contacting conveyor belts adapted to grip said articles in succession between them and to elevate said articles and convey them to a stacking station, said belts being arranged in horizontal runs across the stacking station at the top thereof, a stack receiving table spaced from on side of the stacking station, a pivoted transfer frame at the stacking station including a top horizontal bar arranged close to said horizontal runs and beneath the same, power means to shift the transfer frame from a substantially vertical position beneath said runs to an inclined stacking position above said stacking table so that the frame may carry articles from said horizontal runs to the table, and control means for said power means including a device at the stacking station to sense the presence of each article in succession at the stacking station so that the power means will then actuate the pivoted transfer frame.

5. The invention as defined by claim 4, and wherein said conveyor belts include a substantially sinusoidal article elevating section in advance of said horizontal belt runs, and guide pulley means for said conveyor belts so that the same are maintained taut and in opposed contacting relation throughout their conveying lengths.

6. The invention as defined by claim 4, and wherein said pivoted transfer frame includes a generally vertical body portion and a forwardly extending generally horizontal bottom portion, means pivotally supporting said bottom portion of the frame substantially forwardly of the body portion thereof so that articles suspended from the top of said frame will have both their upper and lower ends traveling through substantial arcs of movement between said horizontal runs and said stack receiving table.

7. The invention as defined by claim 4, and wherein said device to sense the presence of each article at the stacking station is laterally adjustable to facilitate the handling by the apparatus of articles of varying widths.

References Cited by the Examiner

UNITED STATES PATENTS

| | | |
|---|---|---|
| 2,788,967 | 4/1957 | Jesus. |
| 2,855,089 | 10/1958 | Griffin. |
| 3,147,970 | 9/1964 | Davidson _____ 271—7 X |
| 3,167,311 | 1/1965 | Windmiller _____ 271—68 |
| 3,182,617 | 5/1965 | De Laittre. |

M. HENSON WOOD, Jr., *Primary Examiner.*

J. N. ERLICH, *Assistant Examiner.*